US012724464B2

(12) United States Patent
Lin

(10) Patent No.: US 12,724,464 B2
(45) Date of Patent: Sep. 1, 2026

(54) FOLDABLE SUPPORT FRAME AND ELECTRONIC DEVICE THEREOF

(71) Applicant: QISDA CORPORATION, Taoyuan City (TW)

(72) Inventor: Chih-Ying Lin, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 90 days.

(21) Appl. No.: 19/012,814

(22) Filed: Jan. 7, 2025

(65) Prior Publication Data

US 2025/0306642 A1 Oct. 2, 2025

(30) Foreign Application Priority Data

Mar. 26, 2024 (CN) ......................... 202410349380.3

(51) Int. Cl.
*G06F 1/16* (2006.01)

(52) U.S. Cl.
CPC .................................. *G06F 1/1656* (2013.01)

(58) Field of Classification Search
None
See application file for complete search history.

(56) References Cited

U.S. PATENT DOCUMENTS 11,812,570 B1 * 11/2023 Lin ........................ G06F 1/1652
2015/0257299 A1 * 9/2015 Su ......................... G06F 1/1626 361/679.01
2021/0129736 A1 * 5/2021 Mamo ....................... B60R 5/04
2021/0173434 A1 * 6/2021 Campbell ............. G06F 1/1616

FOREIGN PATENT DOCUMENTS

CN 201484590 U 5/2010
CN 109140171 A * 1/2019 ............. F16M 11/06
CN 215769526 U 2/2022
JP 2004345773 A * 12/2004

* cited by examiner

*Primary Examiner* — Xanthia C Relford
(74) *Attorney, Agent, or Firm* — Winston Hsu

(57) ABSTRACT

A foldable support frame includes a substrate, an elastic sheet, and a support sheet. The substrate has a notch and a platform. A fixing portion of the elastic sheet is fixed to the platform to make a flexible portion of the elastic sheet suspended above the notch. A curved groove structure is formed on the flexible portion and faces the notch. The support sheet has a foot, a shaft and a protruding plate. The shaft is pivoted to the notch to make the foot pivotable to a support or folding position. The protruding plate protrudes from the shaft toward the curved groove structure. During pivoting of the foot, the protruding plate rubs against the curved groove structure, or interferes with one of two opposite edges of the curved groove structure in a longitudinal direction perpendicular to the shaft, for driving the foot to the support or folding position.

21 Claims, 11 Drawing Sheets

FOLDABLE SUPPORT FRAME AND ELECTRONIC DEVICE THEREOF

BACKGROUND OF THE INVENTION

1. Field of the Invention

The present invention relates to a foldable support frame and an electronic device thereof, and more specifically, to a foldable support frame forming a curved groove structure on an elastic sheet to drive a support sheet to a support position or a folding position and an electronic device thereof.

2. Description of the Prior Art

In general, most support frames used to support electronic devices (e.g., tablets) on a surface for user operations or image viewing adopt an elastic-sheet pivoting design. A common structural design involves utilizing an elastic potential energy accumulated by a support frame continuously interfering with an elastic sheet while pivoting relative to an electronic device. The elastic potential energy is released when a user unfolds or folds the support frame, so as to apply a torque to the support frame, thereby driving the support frame to quickly pivot to a folding position on one side of the electronic device or to a support position supporting the electronic device obliquely. The aforesaid design helps the user save time and effort in folding or unfolding the support frame.

However, in this design, since the support frame is continuously driven by the elastic potential energy to rapidly pivot to the folding or support position, the support frame often collides with the electronic device at an accelerated speed. This can result in unnecessary and excessive knocking noises, so as to significantly influence the user's operational experience and comfort in folding or unfolding the support frame.

SUMMARY OF THE INVENTION

The present invention provides a foldable support frame including a substrate, a first elastic sheet, and a support sheet. The substrate has a notch and a first platform. The first elastic sheet has a first fixing portion and a first flexible portion. The first fixing portion is fixed to the first platform to make the first flexible portion suspended above the notch, and a first curved groove structure is formed on a position of the first flexible portion facing the notch. The support sheet has a foot, a shaft, and a protruding plate. The shaft is pivoted to the notch to make the foot pivotable relative to the substrate to a support position away from the notch or a folding position within the notch. The protruding plate extends from the shaft toward the first curved groove structure. During pivoting of the foot, the protruding plate rubs against the first curved groove structure, or the protruding plate selectively interferes with one of two opposite first edges of the first curved groove structure in a longitudinal direction perpendicular to the shaft, for generating a torque to drive the foot to the support position or the folding position.

The present invention further provides an electronic device including a device body and a foldable support frame. The foldable support frame is disposed on a support surface of the device body.

The foldable support frame includes a substrate, a first elastic sheet, and a support sheet. The substrate is mounted on the support surface and has a notch and a first platform. The first elastic sheet has a first fixing portion and a first flexible portion. The first fixing portion is fixed to the first platform to make the first flexible portion suspended above the notch, and a first curved groove structure is formed on a position of the first flexible portion facing the notch. The support sheet has a foot, a shaft, and a protruding plate. The shaft is pivoted to the notch to make the foot pivotable relative to the substrate to a support position away from the notch for supporting the device body or to a folding position within the notch. The protruding plate extends from the shaft toward the first curved groove structure. During pivoting of the foot, the protruding plate rubs against the first curved groove structure, or the protruding plate selectively interferes with one of two opposite first edges of the first curved groove structure in a longitudinal direction perpendicular to the shaft, for generating a torque to drive the foot to the support position or the folding position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
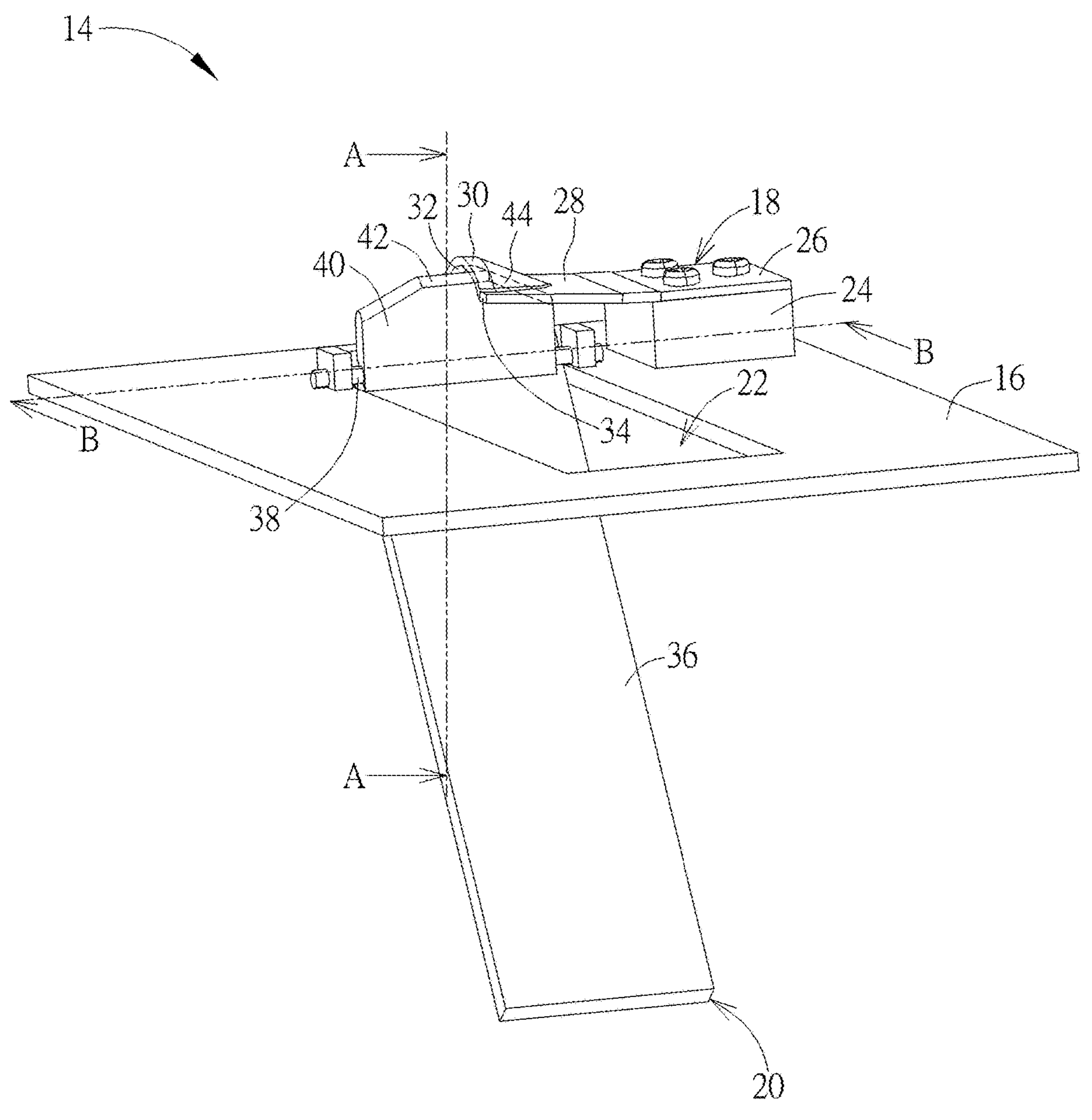
FIG. 1 is a diagram of a foldable support frame according to an embodiment of the present invention.

The present invention will now be described more specifically with reference to the following embodiments and the accompanying drawings. Other advantages and effects of the present invention can be easily understood by a person ordinarily skilled in the art in view of the detailed descriptions and the accompanying drawings. The present invention can be implemented or applied to other different embodiments. Certain aspects of the present invention are not limited by the particular details of the examples illustrated herein. Without departing from the spirit and scope of the present invention, the present invention will have other modifications and changes. It should be understood that the appended drawings are not necessarily drawn to the scale and configuration of each component (e.g., a notch design, a mounting position of a foldable support frame on an electronic device, etc.) in the drawings is merely illustrative, not presenting an actual condition of the embodiments.

Figure 2:
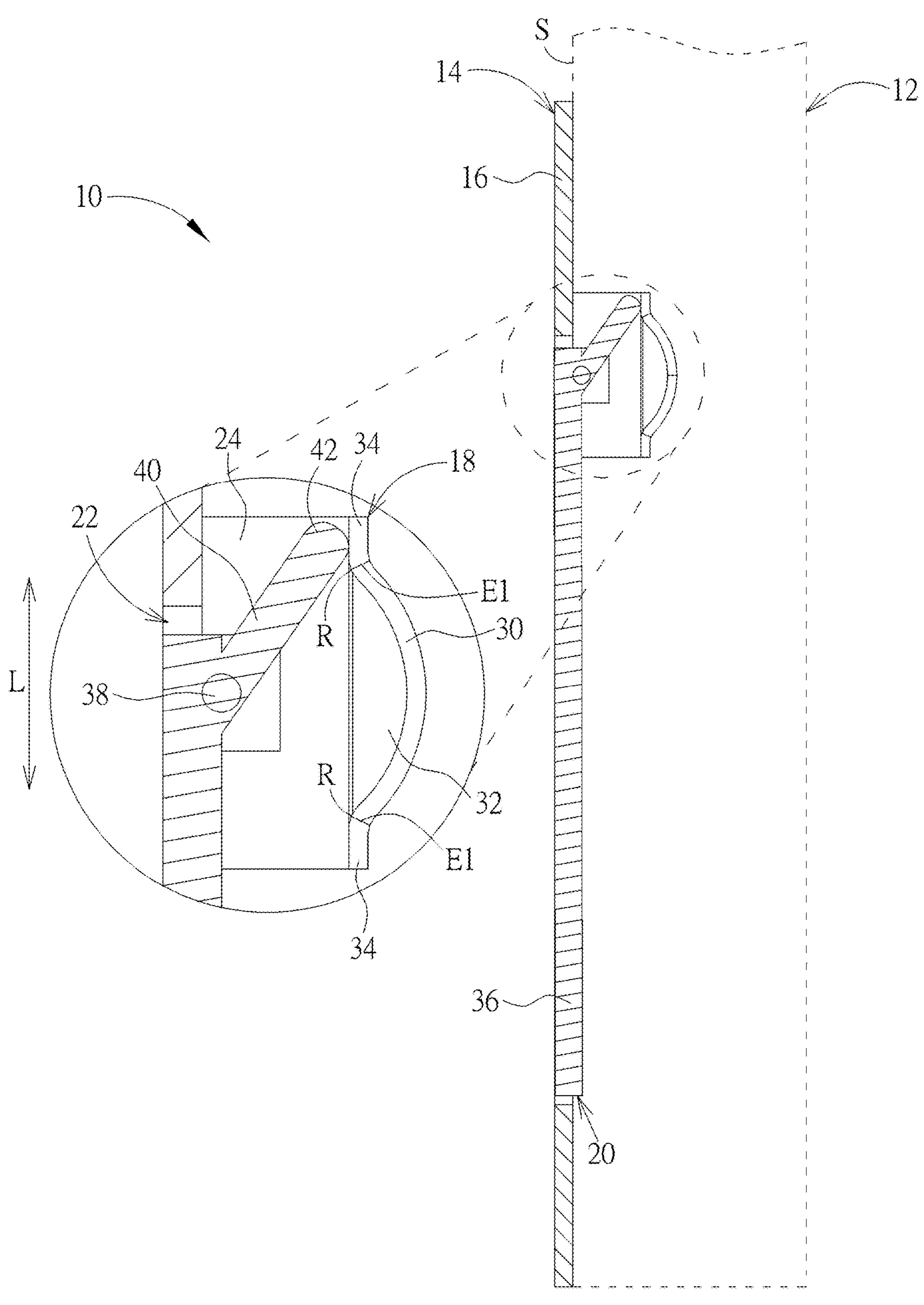
FIG. 2 is a cross-sectional diagram of the foldable support frame in FIG. 1 pivoting to a folding position relative to a device body along a cross-sectional line A-A.

Please refer to FIG. 1 and FIG. 2. FIG. 1 is a diagram of a foldable support frame 14 according to an embodiment of the present invention. FIG. 2 is a cross-sectional diagram of the foldable support frame 14 in FIG. 1 pivoting to a folding position relative to a device body 12 along a cross-sectional line A-A. For clearly showing the structural design of the foldable support frame 14, the device body 12 is only simply depicted by dashed lines in FIG. 2.

An electronic device 10 could be preferably a common electronic product (e.g., a tablet) that requires a support frame to stand on a support surface for user operations or image viewing. As shown in FIG. 1 and FIG. 2, the electronic device 10 includes the device body 12 and the foldable support frame 14. The device body 12 could include components (e.g., housings, circuit boards, processors, etc.) usually used in electronic products, and the related description is omitted herein since it is commonly seen in the prior art.

The foldable support frame 14 is mounted on a support surface S of the device body 12. The foldable support frame 14 includes a substrate 16, a first elastic sheet 18, and a support sheet 20. The substrate 16 has a notch 22 and a first platform 24. The substrate 16 could be mounted on the support surface S via a common fixing method (e.g., screw fastening or adhesive bonding, but not limited thereto), allowing the foldable support frame 14 to be foldably mounted on the device body 12. The first elastic sheet 18 has a first fixing portion 26 and a first flexible portion 28. The first fixing portion 26 is fixed to the first platform 24 (e.g., by screw fastening, but not limited thereto) to make the first flexible portion 28 suspended above the notch 22. A first curved groove structure 30 is formed on a position of the first flexible portion 28 facing the notch 22. The support sheet 20 includes a foot 36, a shaft 38, and a protruding plate 40. The shaft 38 is pivoted to the notch 22, so as to make the foot 36 pivotable relative to the substrate 16. The protruding plate 40 extends from the shaft 38 toward the first curved groove structure 30.

In this embodiment, the first curved groove structure 30 could taper into a first conical concave surface 32 from two opposing first edges E1 along a longitudinal direction L perpendicular to the shaft 38, and the first curved groove structure 30 could extend outwardly from each first edge E1 to respectively form a first planar section 34. Furthermore, as shown in FIG. 1 and FIG. 2, the protruding plate 40 could be preferably formed with a flat-cut end portion 42 corresponding to the first planar section 34 and a first chamfered end portion 44 corresponding to the first conical concave surface 32 (indicated by dashed lines in FIG. 1). During pivoting of the foot 36, when the foot 36 pivots to a support position away from the notch 22 or to a folding position within the notch 22, the first planar section 34 presses the flat-cut end portion 42 to stably maintain the foot 36 in the support position or the folding position. When the foot 36 pivots between the support position and the folding position, the first chamfered end portion 44 rubs against the first conical concave surface 32. Furthermore, when the foot 36 pivots away from the support position or the folding position, the flat-cut end portion 42 interferes with the first planar section 34. The first curved groove structure 30 could include a guiding chamfers R at each first edge E1. The guiding chamfer R can guide the protruding plate 40 to cross the first edge E1 more smoothly while the protruding plate 40 abuts and interferes with the first planar plate portion 34, and then to rub against the first conical concave surface 32.

Figure 3:
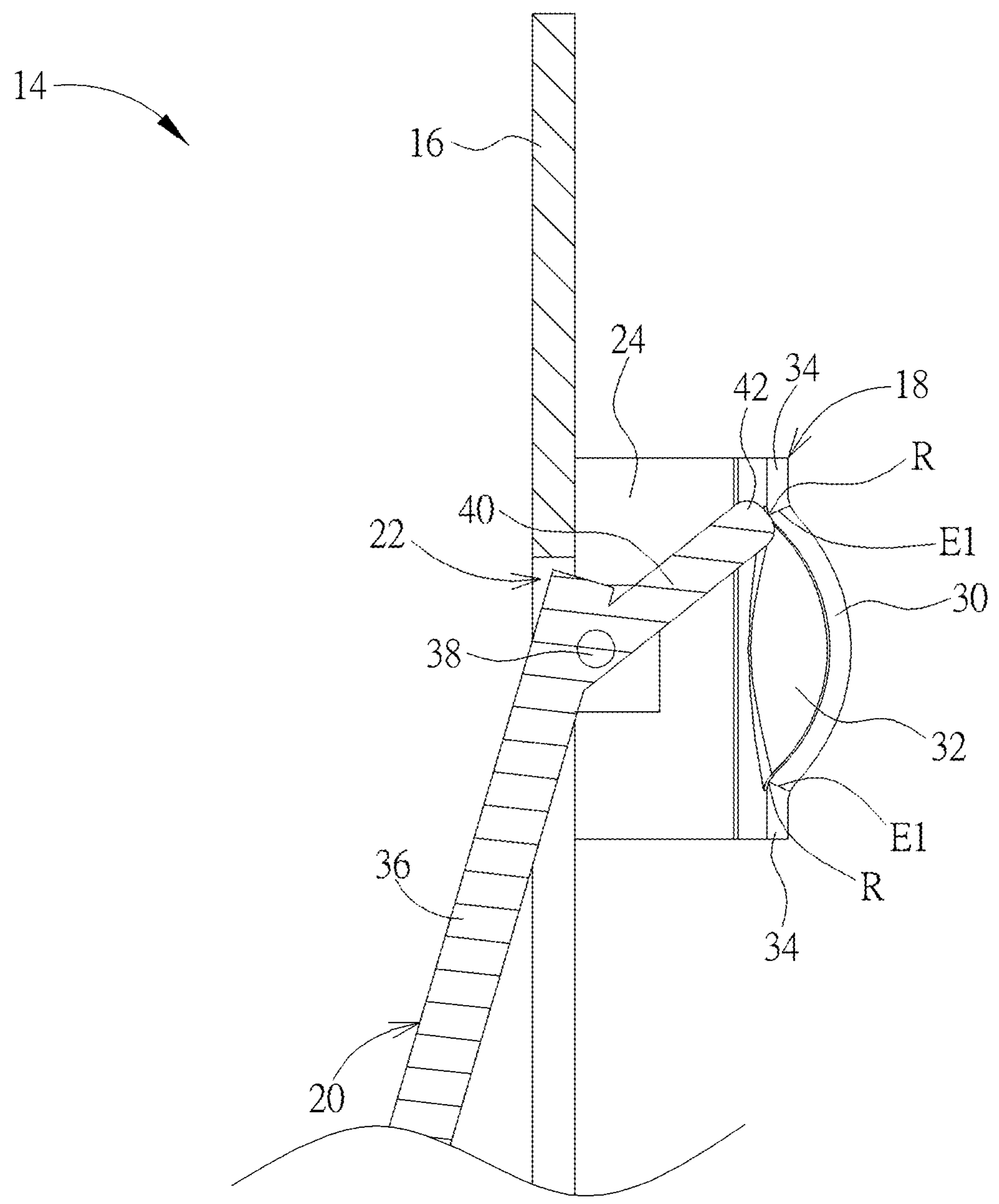
FIG. 3 is a cross-sectional diagram of a foot in FIG. 2 pivoting to a position where a flat-cut end portion interferes with a first edge.
Figure 4:
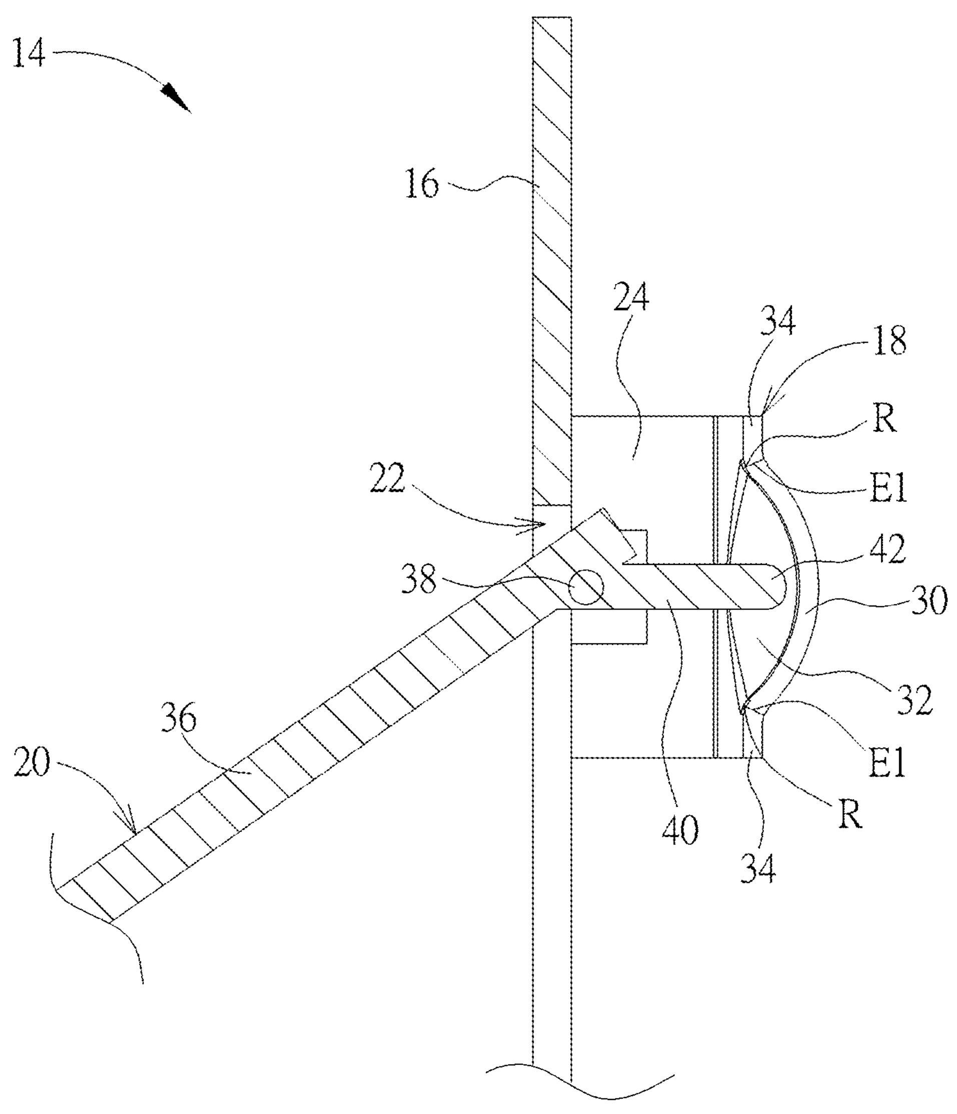
FIG. 4 is a cross-sectional diagram of the foot in FIG. 3 pivoting to a position where a protruding plate rubs against a first conical concave surface.
Figure 5:
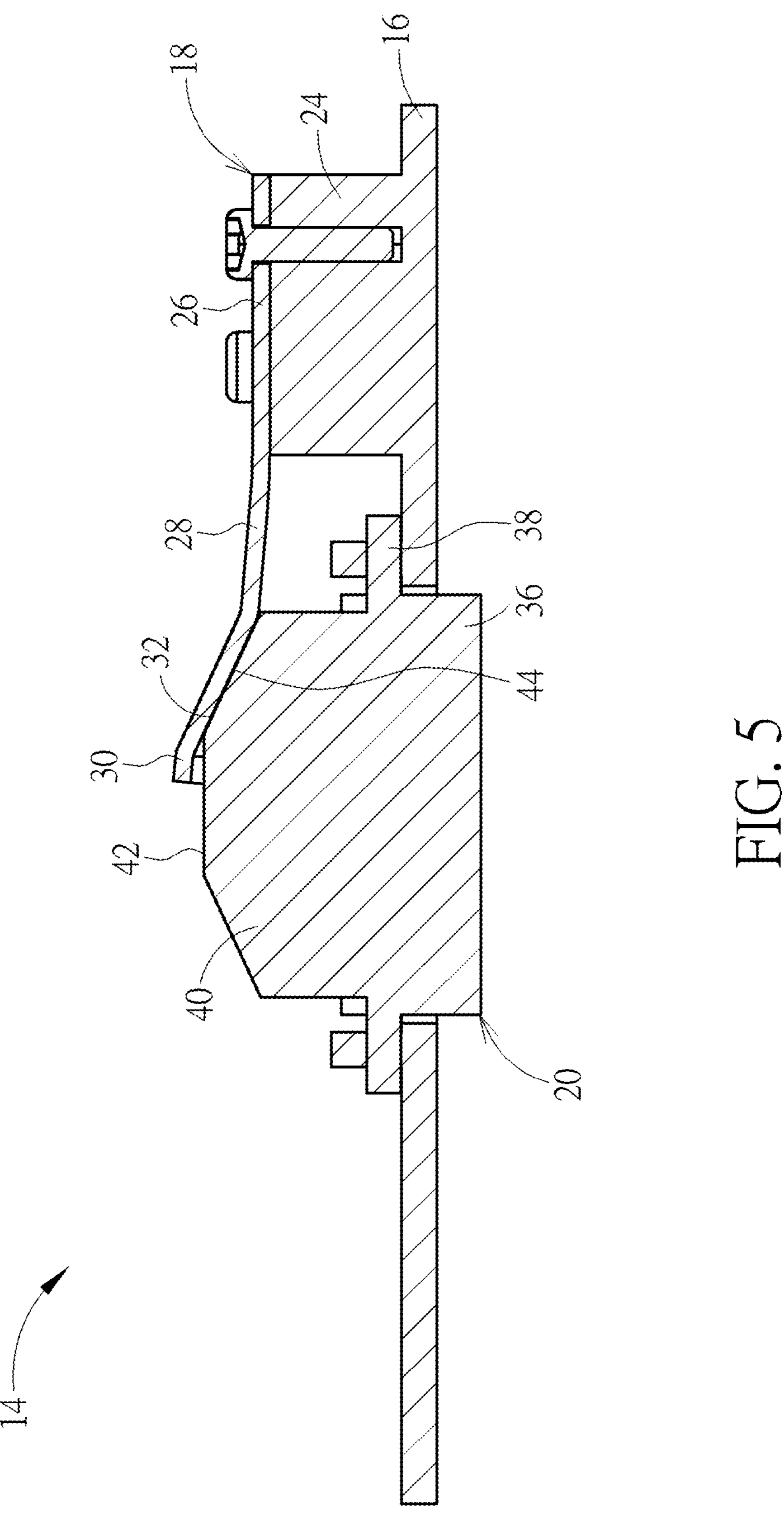
FIG. 5 is a cross-sectional diagram of the foldable support frame in FIG. 1 when the foot pivots to a position where a first chamfered end portion rubs against the first conical concave surface along a cross-sectional line B-B.
Figure 6:
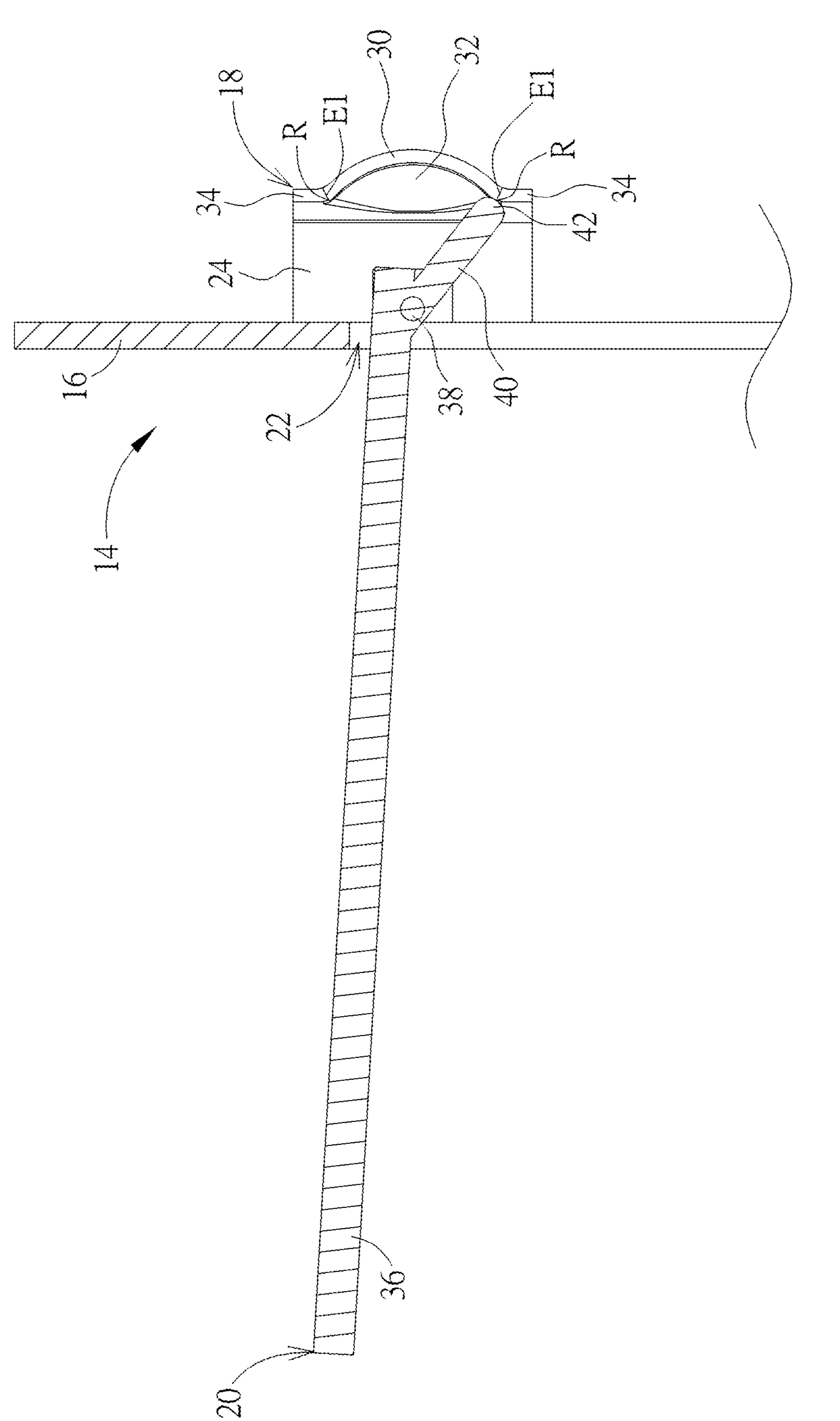
FIG. 6 is a cross-sectional diagram of the foot in FIG. 4 pivoting to a position where the flat-cut end portion interferes with the first edge.
Figure 7:
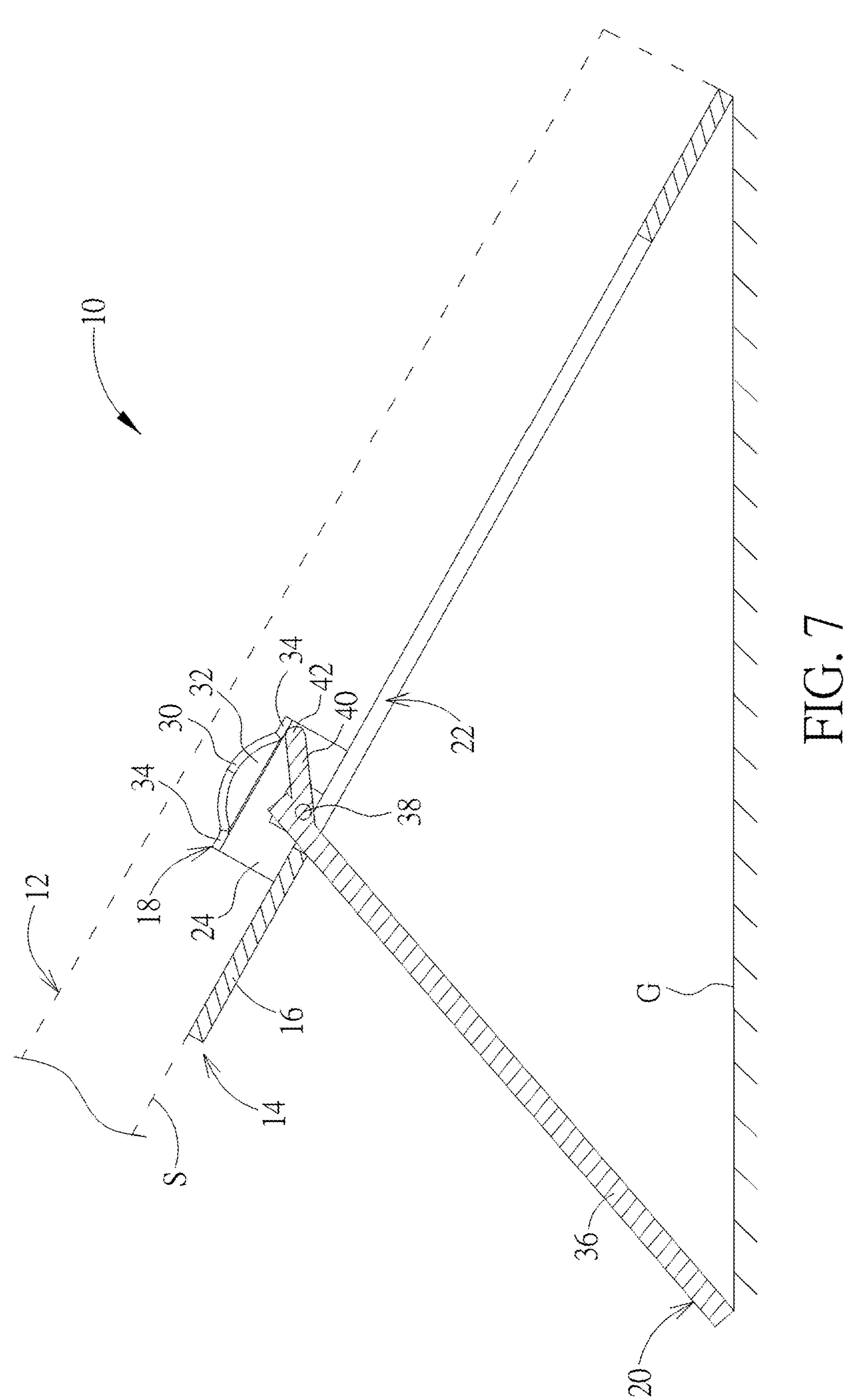
FIG. 7 is a cross-sectional diagram of the foot pivoting to a support position.

More detailed description for unfolding and folding operations of the foldable support frame 14 is provided as follows. Please refer to FIGS. 1-7. FIG. 3 is a cross-sectional diagram of the foot 36 in FIG. 2 pivoting to a position where the flat-cut end portion 42 interferes with the first edge E1. FIG. 4 is a cross-sectional diagram of the foot 36 in FIG. 3 pivoting to a position where the protruding plate 40 rubs against the first conical concave surface 32. FIG. 5 is a cross-sectional diagram of the foldable support frame 14 in FIG. 1 when the foot 36 pivots to the position where the first chamfered end portion 44 rubs against the first conical concave surface 32 along a cross-sectional line B-B. FIG. 6 is a cross-sectional diagram of the foot 36 in FIG. 4 pivoting to a position where the flat-cut end portion 42 interferes with the first edge E1. FIG. 7 is a cross-sectional diagram of the foot 36 pivoting to the support position. For clearly showing the structural design of the foldable support frame 14, the device body 12 is only simply depicted by dashed lines in FIG. 7.

As shown in FIGS. 1-7, when a user wants to incline the electronic device 10 on a support surface G (e.g., a desktop) for performing related operations, the user just needs to pivot the foot 36 from the folding position as shown in FIG. 2 relative to the substrate 16, allowing the foot 36 to move away from the notch 22 (for example, pivoting to a position shown in FIG. 4, but not limited thereto). During this process, as the foot 36 pivots, a relative contact position between the protruding plate 40 and the first curved groove structure 30 transitions from a position where the first planar section 34 presses the flat-cut end portion 42 as shown in FIG. 2, over a position where the flat-cut end portion 42 interferes with the first edge E1 as shown in FIG. 3, and gradually to a position where the first chamfered end portion 44 rubs against the first conical concave surface 32. Since the first conical concave surface 32 is spaced from the flat-cut end portion 42 during the aforesaid rubbing process, there is no contact between the first conical concave surface 32 and the flat-cut end portion 42 (as shown in FIGS. 4 and 5), so a torque applied by the first elastic sheet 18 to the foot 36 can be considered negligible. In other words, during the pivoting process in which an expansion angle of the support foot 36 gradually increases relative to the substrate 16 to make the first chamfered end 44 rub against the first conical concave surface 32, the torque applied by the first elastic sheet 18 to the foot 36 gradually decreases to zero. As such, after the user exerts a force to overcome the torque applied by the first elastic sheet 18 to the foot 36 while the foot 36 leaves the folding position, the user can easily pivot the foot 36 over the first edge E1 of the first curved groove structure 30, and then can pivot the foot 36 within a pivoting range defined by the first curved groove structure 30 (as shown in FIGS. 3, 4, and 6). To be noted, while the foot 36 pivots within the aforementioned pivoting range, the user can stop the foot 36 at any position within this pivoting range due to the frictional contact between the first chamfered end portion 44 and the first conical concave surface 32, thereby generating a free-stop effect, so as to greatly enhance the operational convenience of the foldable support frame 14.

Next, the user could continue to pivot the foot 36 to a position where the first planar section 34 presses the flat-cut end portion 42 as shown in FIG. 7, to complete the unfolding operation of the foldable support frame 14. During this process, with pivoting of the foot 36 relative to the substrate 16, the relative contact position between the protruding plate 40 and the first curved groove structure 30 transitions from the position where the first chamfered end portion 44 rubs against the first conical concave surface 32, over a position where the flat-cut end portion 42 interferes with the first edge E1 as shown in FIG. 6, and gradually to the position where the first planar section 34 presses the flat-cut end portion 42 as shown in FIG. 7. In other words, with the increasing expansion angle of the support foot 36 relative to the substrate 16, the torque applied by the first elastic sheet 18 to the foot 36 gradually increases from zero, accelerating the foot 36 to the support position after the protruding plate 40 passes over the first edge E1 of the first curved groove structure 30 as shown in FIG. 6. In such a manner, the device body 12 can be supported on the support surface G (as shown in FIG. 7) for the user to perform subsequent related operations (e.g., touch operations, viewing images, etc.).

On the other hand, if the user wants to perform the folding operation of the foldable support frame 14, the user just needs to pivot the foot 36 from the support position as shown in FIG. 7 relative to the substrate 16 toward the notch 22. During this process in which the expansion angle of the support foot 36 gradually decreases relative to the substrate 16 to make the first chamfered end 44 rub against the first conical concave surface 32, the torque applied by the first elastic sheet 18 to the foot 36 gradually decreases to zero. As such, after the user exerts a force to overcome the torque applied by the first elastic sheet 18 to the foot 36 while the foot 36 leaves the folding position, the user can easily pivot the foot 36 over the first edge E1 of the first curved groove structure 30, and then can pivot the foot 36 within the pivoting range defined by the first curved groove structure 30 (as shown in FIGS. 3, 4, and 6).

Next, the user can continue to pivot the foot 36 to the position where the first planar section 34 presses the flat-cut end portion 42, as shown in FIG. 2, to complete the folding operation of the foldable support frame 14. During this process, with the decreasing expansion angle of the foot 36 relative to the substrate 16, the torque applied by the first elastic sheet 18 to the foot 36 gradually increases from zero, thereby accelerating the foot 36 to the folding position after the protruding plate 40 passes over the first edge E1 of the first curved groove structure 30 as shown in FIG. 3. In such a manner, the support sheet 20 can be contained within the notch 22 for the user to conveniently carry or store the electronic device 10.

In summary, compared with the prior art in which a continuous interference between the elastic sheet and the support frame is used to accumulate the elastic potential energy for quickly pivoting the support frame to the folding position or the support position, the present invention adopts the design in which the curved groove structure is formed on the elastic sheet. In this design, the support sheet only interferes with the elastic sheet and is then driven by the elastic sheet to pivot to the support or folding position after pivoting outward over the edge of the curved groove structure relative to the elastic sheet. In such a manner, the present invention not only helps the user easily and efficiently complete the folding or unfolding operation of the foldable support frame, but also effectively solves the prior art problem that the support frame is continuously driven by the elastic sheet to cause the accelerated collision with the electronic device. Thus, the present invention can avoid unnecessary and excessive knocking noises, so as to greatly improve the user's operational experience and comfort in folding or unfolding the foldable support frame.

Figure 8:
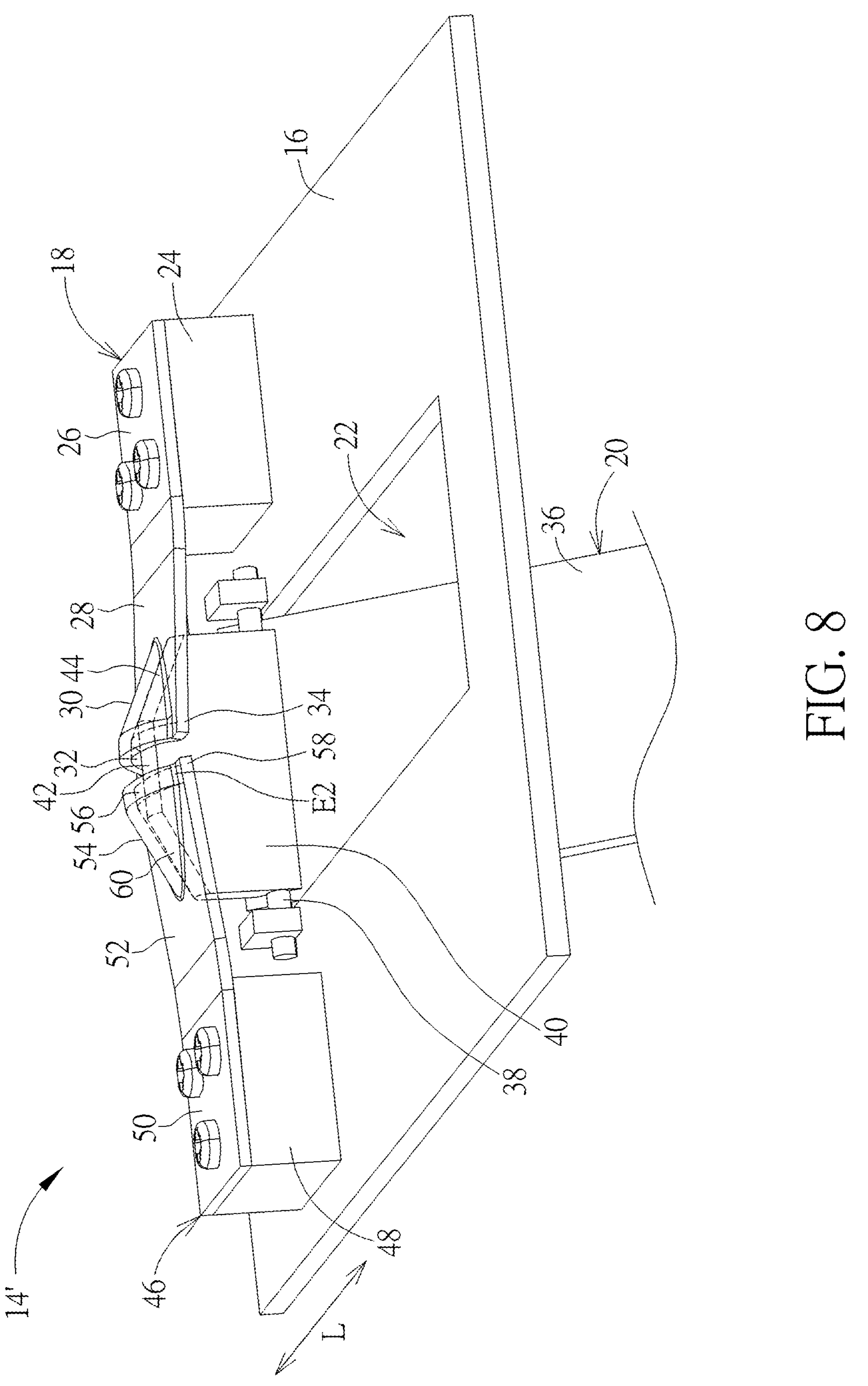
FIG. 8 is a partial enlarged diagram of a foldable support frame according to another embodiment of the present invention.

It should be mentioned that in practical applications, the present invention could further adopt a symmetrical design with dual elastic sheets to effectively prevent the support sheet from skewing due to uneven force, thereby improving the support stability of the foldable support frame. For example, please refer to FIG. 8, which is a partial enlarged diagram of a foldable support frame 14' according to another embodiment of the present invention. Components both mentioned in this embodiment and the aforesaid embodiments represent components with similar structures or functions, and the related description is omitted herein. As shown in FIG. 8, the foldable support frame 14' includes the substrate 16, the first elastic sheet 18, the support sheet 20, and a second elastic sheet 46. The substrate 16 has the notch 22, the first platform 24, and a second platform 48. The second elastic sheet 46 has a second fixing portion 50 and a second flexible portion 52, wherein the first platform 24 and the second platform 48 are located on opposite sides of the notch 22 and face each other. The second fixing portion 50 is fixed to the second platform 48 (e.g., by screw fastening, but not limited thereto), so that the second flexible portion 52 is suspended above the notch 22, and a second curved groove structure 54 is formed on a position of the second flexible portion 52 facing the notch 22. In this embodiment, the second curved groove structure 54 tapers into a second conical concave surface 56 from two opposing second edges E2 along the longitudinal direction L, and the second curved groove structure 54 extends outwardly from each second edge E2 to form a second planar section 58. Furthermore, as shown in FIG. 8, the protruding plate 40 could be preferably formed with a second chamfered end portion 60 corresponding to the second conical concave surface 56 (indicated by dashed lines in FIG. 8). During the pivoting process of the foot 36, when the foot 36 pivots to the support position or the folding position, the first planar section 34 and the second planar section 58 cooperatively press the flat-cut end portion 42 to maintain the foot 36 evenly in the support position or the folding position. When the foot 36 pivots between the support position and the folding position, the first chamfered end portion 44 and the second chamfered end portion 60 rub against the first conical concave surface 32 and the second conical concave surface 56 respectively. Furthermore, when the foot 36 pivots away from the support position or the folding position, the flat-cut end portion 42 can interfere with the first planar section 34 and the second planar section 58. As for the unfolding and folding operations and other designs of the foldable support frame 14' (e.g., forming guiding chamfers at positions corresponding to the second edges of the second curved groove structure), the related description could be reasoned by analogy according to the aforesaid embodiments and omitted herein.

Figure 9:
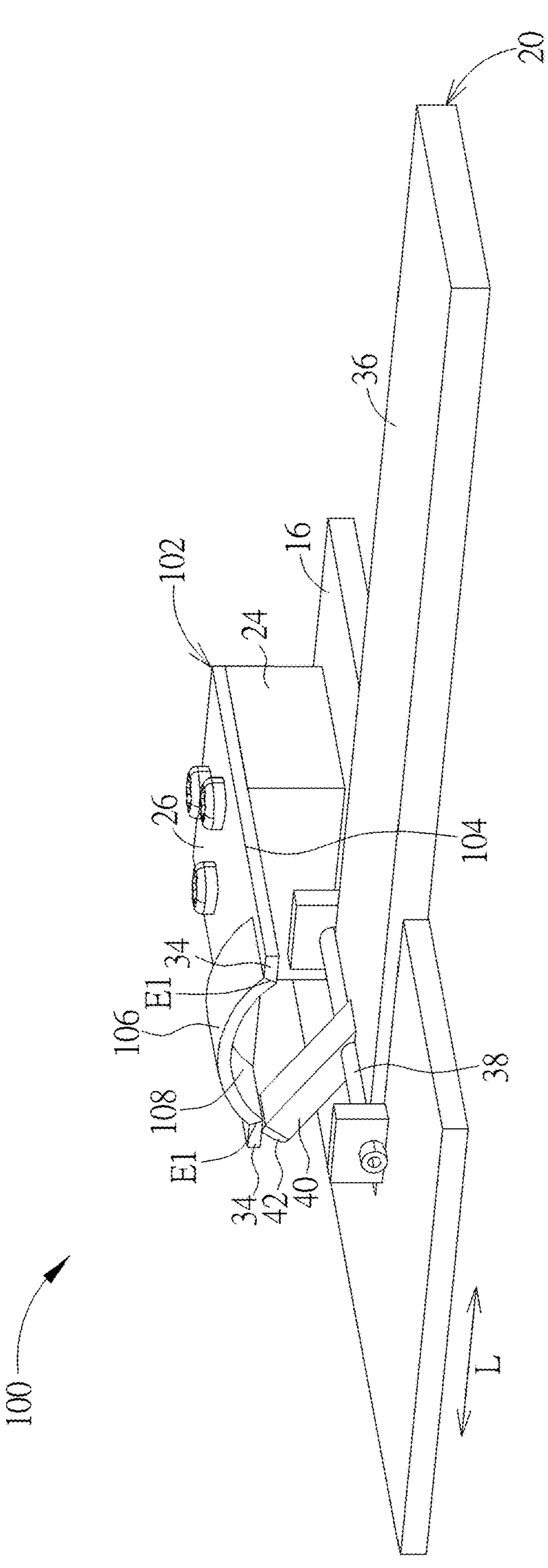
FIG. 9 is a diagram of a foldable support frame when the foot pivots to the folding position according to another embodiment of the present invention.
Figure 10:
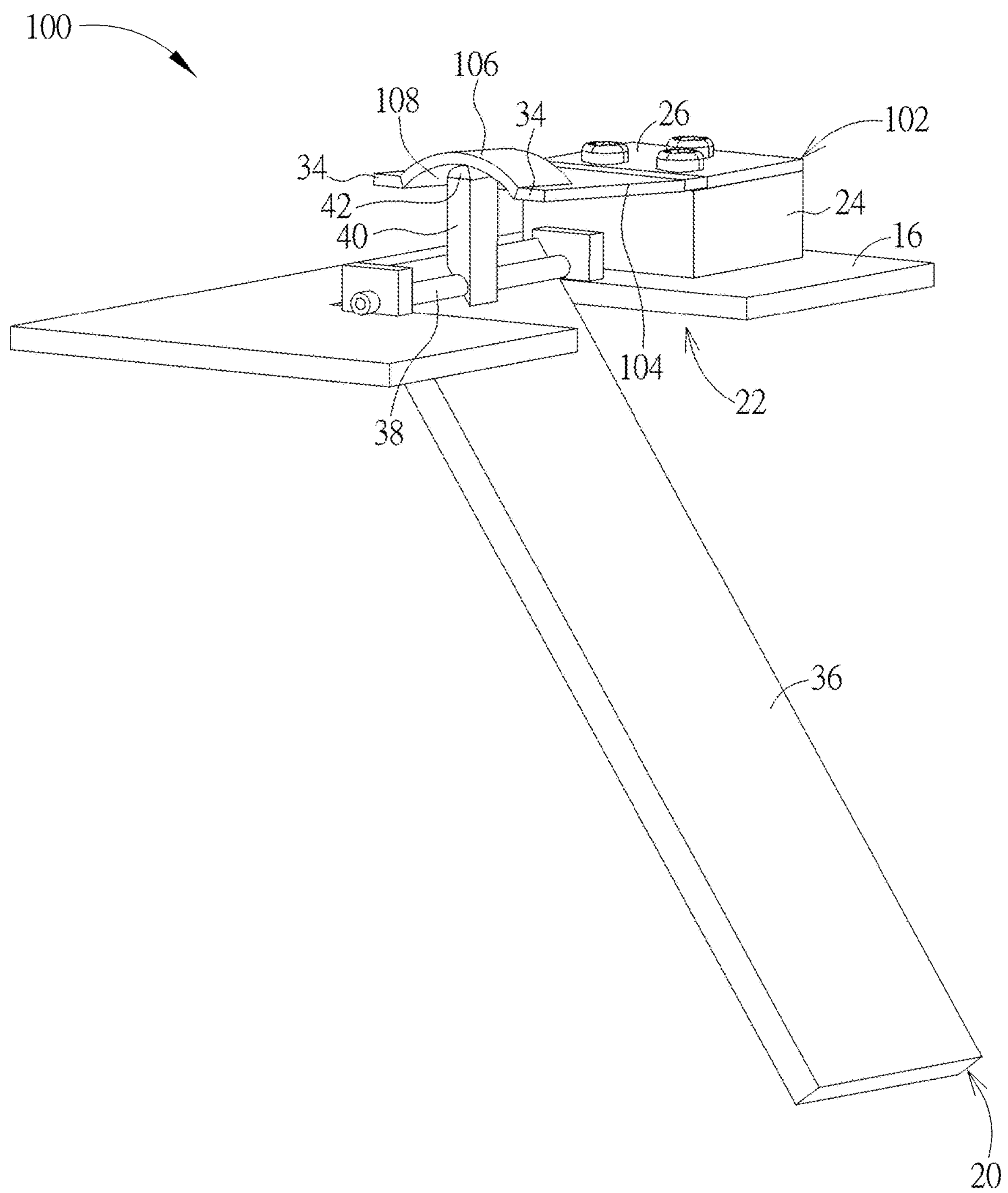
FIG. 10 is a diagram of the foot in FIG. 9 pivoting to a position where the protruding plate rubs against an arc concave surface.
Figure 11:
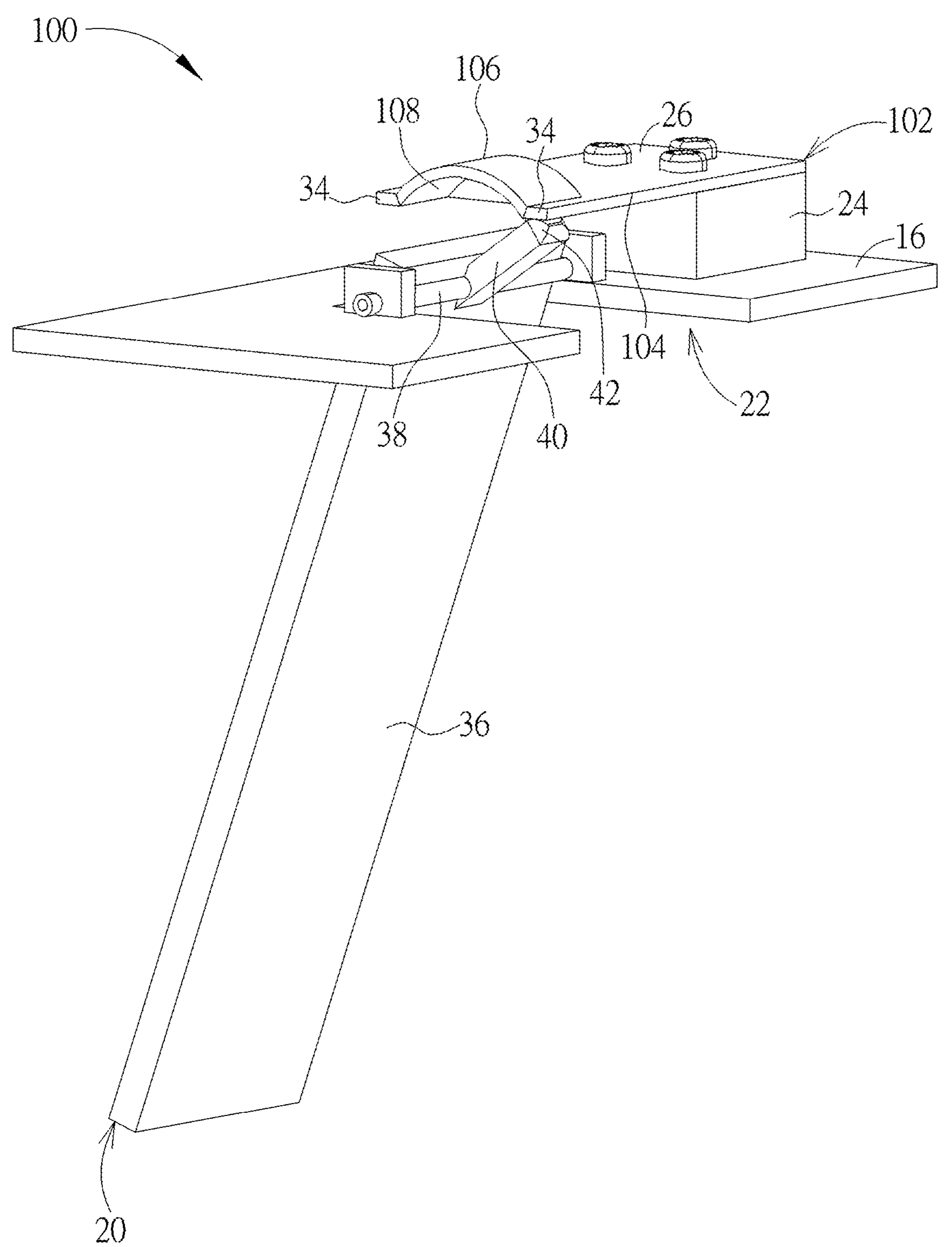
FIG. 11 is a diagram of the foot in FIG. 10 pivoting to the support position.

In addition to the conical concave surface design mentioned above, the present invention could also adopt an arc concave surface design. For example, please refer to FIGS. 9-11. FIG. 9 is a diagram of a foldable support frame 100 when the foot 36 pivots to the folding position according to another embodiment of the present invention. FIG. 10 is a diagram of the foot 36 in FIG. 9 pivoting to a position where the protruding plate 40 rubs against an arc concave surface 108. FIG. 11 is a diagram of the foot 36 in FIG. 10 pivoting to the support position. Components both mentioned in this embodiment and the aforesaid embodiments represent components with similar structures or functions, and the related description is omitted herein. As shown in FIGS. 9-11, the foldable support frame 100 includes the substrate 16, a first elastic sheet 102, and the support sheet 20. The first elastic sheet 102 has the first fixing portion 26 and a first flexible portion 104. The first fixing portion 26 is fixed to the first platform 24 to make the first flexible portion 104 suspended above the notch 22. A first curved groove structure 106 is formed on a position of the first flexible portion 104 facing the notch 22. In this embodiment, the first curved groove structure 106 extends along the longitudinal direction L between the opposing first edges E1 to form the arc concave surface 108. The first curved groove structure 106 extends outwardly from each first edge E1 to form the first planar section 34. Therefore, during the pivoting process of the foot 36, when the foot 36 pivots to the support position as shown in FIG. 11 or the folding position as shown in FIG. 9, the first planar section 34 presses the flat-cut end portion 42 of the protruding plate 40 to stably maintain the foot 36 in the support position or the folding position. Meanwhile, when the foot 36 pivots between the support position and the folding position, the flat-cut end portion 42 correspondingly rubs against the arc concave surface 108. Furthermore, when the foot 36 pivots away from the support position or the folding position, the flat-cut end portion 42 interferes with the first planar section 34. As for the unfolding and folding operations and other designs of the foldable support frame 100 (e.g., forming guiding chamfers at positions corresponding to the first edges of the first curved groove structure), the related description could be reasoned by analogy according to the aforesaid embodiments and omitted herein.

Those skilled in the art will readily observe that numerous modifications and alterations of the device and method could be made while retaining the teachings of the invention. Accordingly, the above disclosure should be construed as limited only by the metes and bounds of the appended claims.

What is claimed is:

1. A foldable support frame comprising:

a substrate having a notch and a first platform;

a first elastic sheet having a first fixing portion and a first flexible portion, the first fixing portion being fixed to the first platform to make the first flexible portion suspended above the notch, and a first curved groove structure being formed on a position of the first flexible portion facing the notch; and a support sheet having a foot, a shaft, and a protruding plate, the shaft being pivoted to the notch to make the foot pivotable relative to the substrate to a support position away from the notch or a folding position within the notch, and the protruding plate extending from the shaft toward the first curved groove structure, wherein during pivoting of the foot, the protruding plate rubs against the first curved groove structure, or the protruding plate selectively interferes with one of two opposite first edges of the first curved groove structure in a longitudinal direction perpendicular to the shaft, for generating a torque to drive the foot to the support position or the folding position.

2. The foldable support frame of claim 1, wherein the first curved groove structure extends along the longitudinal direction between the two first edges to form an arc concave surface, and the first curved groove structure extends outwardly from the two first edges to respectively form a planar section; when the foot pivots to the support position or the folding position, the planar section presses the protruding plate; when the foot pivots between the support position and the folding position, the protruding plate rubs against the arc concave surface.

3. The foldable support frame of claim 2, wherein the protruding plate has a flat-cut end portion at a position corresponding to the planar section; when the foot pivots away from the support position or the folding position, the flat-cut end portion interferes with the planar section.

4. The foldable support frame of claim 2, wherein a guiding chamfer is formed on each of the two first edges of the first curved groove structure.

5. The foldable support frame of claim 1, wherein the first curved groove structure tapers into a conical concave surface from the two first edges toward the first platform along the shaft, and the first curved groove structure extends outwardly from the two first edges to respectively form a planar section; when the foot pivots to the support position or the folding position, the planar section presses the protruding plate; when the foot pivots between the support position and the folding position, the protruding plate rubs against the conical concave surface.

6. The foldable support frame of claim 5, wherein the protruding plate has a flat-cut end portion at a position corresponding to the planar section and a chamfered end portion at a position corresponding to the conical concave surface; when the foot pivots to the support position or the folding position, the planar section presses the flat-cut end portion; when the foot pivots between the support position and the folding position, the chamfered end portion rubs against the conical concave surface; when the foot pivots away from the support position or the folding position, the flat-cut end portion interferes with the planar section.

7. The foldable support frame of claim 5, wherein a guiding chamfer is formed on each of the two first edges of the first curved groove structure.

8. The foldable support frame of claim 1, wherein the substrate further comprises a second platform, and the first platform and the second platform are located on opposite sides of the notch; the foldable support frame further comprises a second elastic sheet having a second fixing portion and a second flexible portion, the second fixing portion is fixed to the second platform to make the second flexible portion suspended above the notch, and a second curved groove structure is formed on a position of the second flexible portion facing the notch; during the pivoting of the foot, the protruding plate rubs against the second curved groove structure, or the protruding plate selectively interferes with one of two opposite second edges of the second curved groove structure in the longitudinal direction, for generating the torque to drive the foot to the support position or the folding position.

9. The foldable support frame of claim 8, wherein the first curved groove structure tapers into a first conical concave surface from the two first edges toward the first platform along the shaft, and the first curved groove structure extends outwardly from the two first edges to respectively form a first planar section; the second curved groove structure tapers into a second conical concave surface from the two second edges toward the second platform along the shaft, and the second curved groove structure extends outwardly from the two second edges to respectively form a second planar section; when the foot pivots to the support position or the folding position, the first planar section and the second planar section press the protruding plate; when the foot pivots between the support position and the folding position, the protruding plate rubs against the first conical concave surface and the second conical concave surface.

10. The foldable support frame of claim 9, wherein the protruding plate has a flat-cut end portion at a position corresponding to the first planar section and the second planar section, and has a first chamfered end portion and a second chamfered end portion at positions corresponding to the first conical concave surface and the second conical concave surface, respectively; when the foot pivots to the support position or the folding position, the first planar section and the second planar section press the flat-cut end portion; when the foot pivots between the support position and the folding position, the first chamfered end portion rubs against the first conical concave surface, and the second chamfered end portion rubs against the second conical concave surface; when the foot pivots away from the support position or the folding position, the flat-cut end portion interferes with the first planar section and the second planar section.

11. The foldable support frame of claim 8, wherein a guiding chamfer is formed on each of the two first edges of the first curved groove structure and the two second edges of the second curved groove structure.

12. An electronic device comprising:

a device body; and a foldable support frame disposed on a support surface of the device body, the foldable support frame comprising:

a substrate mounted on the support surface and having a notch and a first platform;

a first elastic sheet having a first fixing portion and a first flexible portion, the first fixing portion being fixed to the first platform to make the first flexible portion suspended above the notch, and a first curved groove structure being formed on a position of the first flexible portion facing the notch; and a support sheet having a foot, a shaft, and a protruding plate, the shaft being pivoted to the notch to make the foot pivotable relative to the substrate to a support position away from the notch for supporting the device body or to a folding position within the notch, and the protruding plate extending from the shaft toward the first curved groove structure, wherein during pivoting of the foot, the protruding plate rubs against the first curved groove structure, or the protruding plate selectively interferes with one of two opposite first edges of the first curved groove structure in a longitudinal direction perpendicular to the shaft, for generating a torque to drive the foot to the support position or the folding position.

13. The electronic device of claim 12, wherein the first curved groove structure extends along the longitudinal direction between the two first edges to form an arc concave surface, and the first curved groove structure extends outwardly from the two first edges to respectively form a planar section; when the foot pivots to the support position or the folding position, the planar section presses the protruding plate; when the foot pivots between the support position and the folding position, the protruding plate rubs against the arc concave surface.

14. The electronic device of claim 13, wherein the protruding plate has a flat-cut end portion at a position corresponding to the planar section; when the foot pivots away from the support position or the folding position, the flat-cut end portion interferes with the planar section.

15. The electronic device of claim 12, wherein the first curved groove structure tapers into a conical concave surface from the two first edges toward the first platform along the shaft, and the first curved groove structure extends outwardly from the two first edges to respectively form a planar section; when the foot pivots to the support position or the folding position, the planar section presses the protruding plate; when the foot pivots between the support position and the folding position, the protruding plate rubs against the conical concave surface.

16. The electronic device of claim 15, wherein the protruding plate has a flat-cut end portion at a position corresponding to the planar section and a chamfered end portion at a position corresponding to the conical concave surface; when the foot pivots to the support position or the folding position, the planar section presses the flat-cut end portion; when the foot pivots between the support position and the folding position, the chamfered end portion rubs against the conical concave surface; when the foot pivots away from the support position or the folding position, the flat-cut end portion interferes with the planar section.

17. The electronic device of claim 15, wherein a guiding chamfer is formed on each of the two first edges of the first curved groove structure.

18. The electronic device of claim 12, wherein the substrate further comprises a second platform, and the first platform and the second platform are located on opposite sides of the notch; the foldable support frame further comprises a second elastic sheet having a second fixing portion and a second flexible portion, the second fixing portion is fixed to the second platform to make the second flexible portion suspended above the notch, and a second curved groove structure is formed on a position of the second flexible portion facing the notch; during the pivoting of the foot, the protruding plate rubs against the second curved groove structure, or the protruding plate selectively interferes with one of two opposite second edges of the second curved groove structure in the longitudinal direction, for generating the torque to drive the foot to the support position or the folding position.

19. The electronic device of claim 18, wherein the first curved groove structure tapers into a first conical concave surface from the two first edges toward the first platform along the shaft, and the first curved groove structure extends outwardly from the two first edges to respectively form a first planar section; the second curved groove structure tapers into a second conical concave surface from the two second edges toward the second platform along the shaft, and the second curved groove structure extends outwardly from the two second edges to respectively form a second planar section; when the foot pivots to the support position or the folding position, the first planar section and the second planar section press the protruding plate; when the foot pivots between the support position and the folding position, the protruding plate rubs against the first conical concave surface and the second conical concave surface.

20. The electronic device of claim 19, wherein the protruding plate has a flat-cut end portion at a position corresponding to the first planar section and the second planar section, and has a first chamfered end portion and a second chamfered end portion at positions corresponding to the first conical concave surface and the second conical concave surface, respectively; when the foot pivots to the support position or the folding position, the first planar section and the second planar section press the flat-cut end portion; when the foot pivots between the support position and the folding position, the first chamfered end portion rubs against the first conical concave surface, and the second chamfered end portion rubs against the second conical concave surface; when the foot pivots away from the support position or the folding position, the flat-cut end portion interferes with the first planar section and the second planar section.

21. The electronic device of claim 18, wherein a guiding chamfer is formed on each of the two first edges of the first curved groove structure and the two second edges of the second curved groove structure.

* * * * *